United States Patent [19]

Barnett

[11] Patent Number: 5,460,576
[45] Date of Patent: Oct. 24, 1995

[54] BICYCLE CHAIN GUIDE

[76] Inventor: Robert L. Barnett, 2090 Meyer Pl., Costa Mesa, Calif. 92627

[21] Appl. No.: 133,409

[22] Filed: Oct. 7, 1993

[51] Int. Cl.$^6$ ..................................................... F16H 7/00
[52] U.S. Cl. ............................................ 474/144; 474/140
[58] Field of Search ........................... 474/140, 144–147, 474/80

[56] References Cited

U.S. PATENT DOCUMENTS

| | | | |
|---|---|---|---|
| 4,832,667 | 5/1989 | Wren | 474/144 X |
| 4,960,402 | 10/1990 | Klein et al. | 474/140 X |

*Primary Examiner*—Michael Powell Buiz
*Attorney, Agent, or Firm*—Roy A. Ekstrand

[57] ABSTRACT

A bicycle chain guide is secured to the front hub portion of an otherwise conventional bicycle having a multiple speed chain drive and plural front sprocket coupled to a pedal crank. The bicycle chain guide is pivotally secured beneath the front hub and defines a plurality of staggered step portions corresponding generally to the outer diameters of the plural front sprockets. Sufficient clearance is provided between the step portions and the front sprockets to avoid rubbing against the chain engaged with one of the front sprockets. In the event a chain whipping motion or wave is imparted to the bicycle chain, the minimal clearance between the step portions of the chain guide and the underlying chain captivate the chain against the engaged sprocket and prevent separation thereof. During chain transfer between sprockets, the lateral motion of the chain displaces the pivotally secured guide temporarily afterwhich a return spring restores the chain guide to the proper position. Alternate embodiments are shown in which the entire chain guide is pivotable in a front to back direction to facilitate the absorption of impact against the chain guide assembly.

16 Claims, 4 Drawing Sheets

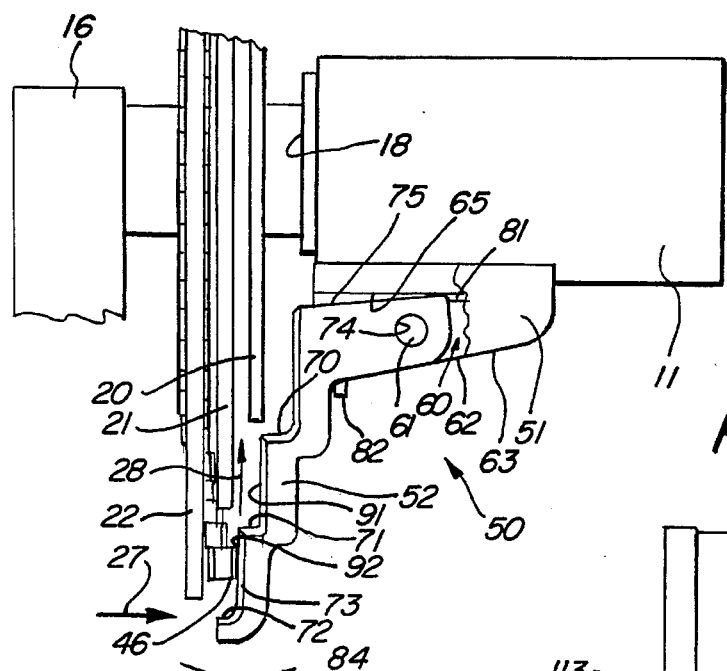
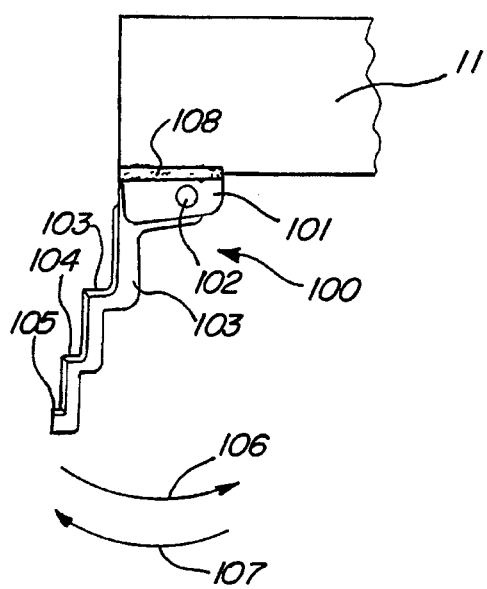
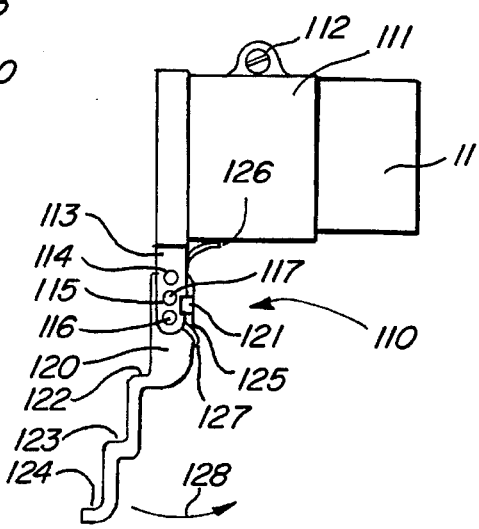
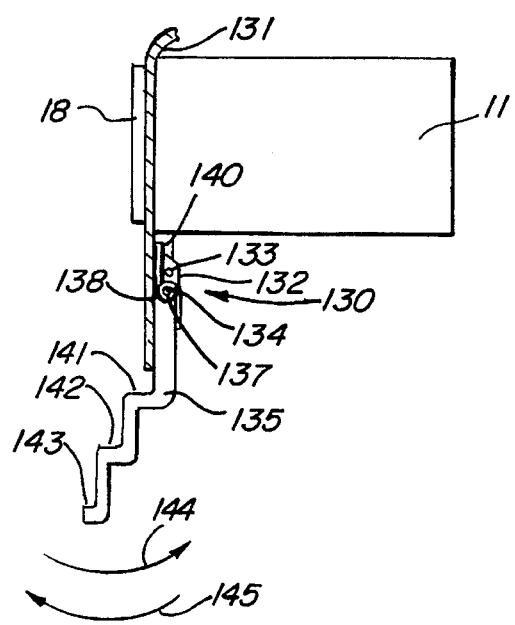

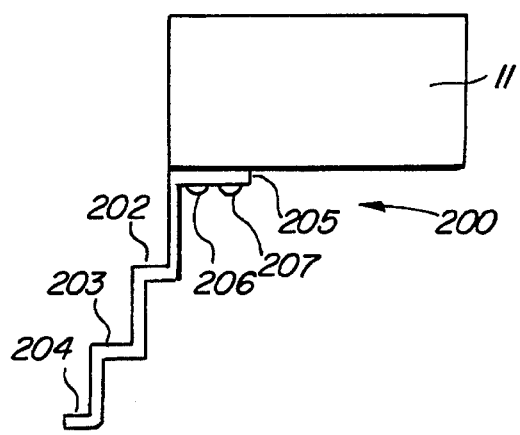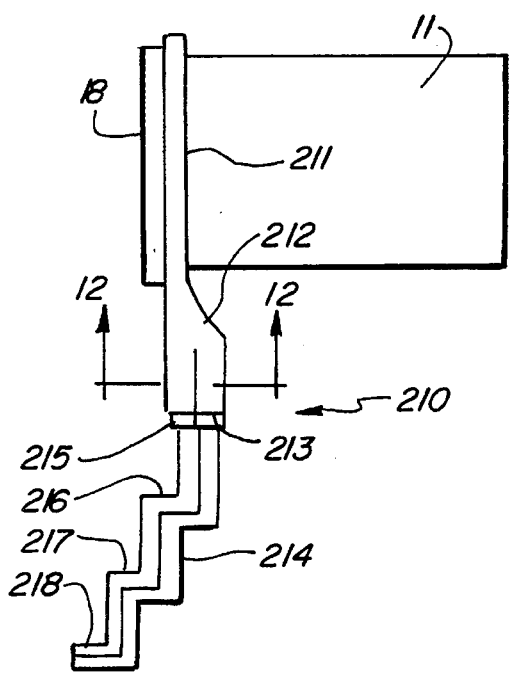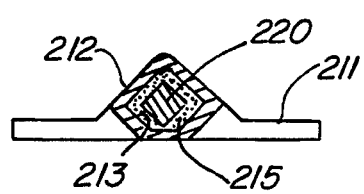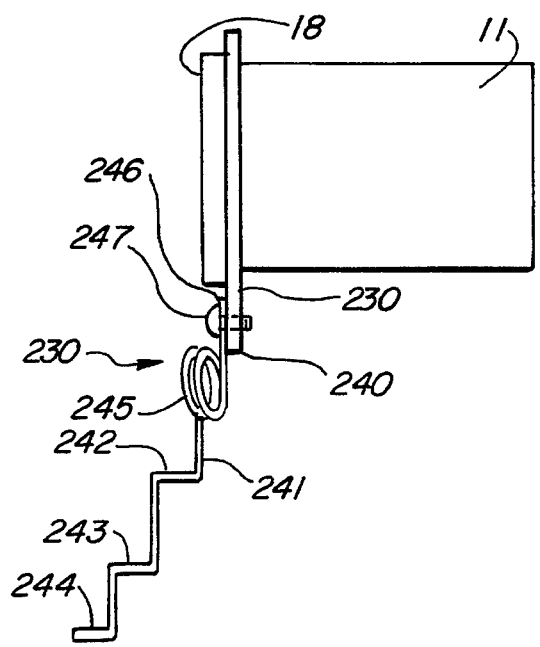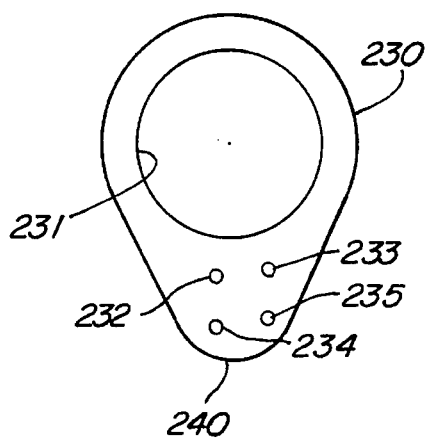

BICYCLE CHAIN GUIDE

FIELD OF THE INVENTION

This invention relates generally to bicycles and particularly to those having multiple sprocket chain drive systems.

BACKGROUND OF THE INVENTION

Bicycle riding or cycling has remained a popular sport and recreational activity for many years. Bicycling has been known by several names including cycling or biking. Understandably, participants in this sport and recreation activity are found bicycling in a variety of environmental circumstances ranging from high speed competition racing to slow casual pleasure riding. One of the more interesting types of cycling to emerge through the years is that generally referred to as off-road biking or mountain biking. In this sport activity, participants often ride over extremely rough terrain and challenging hill and mountain trails subjecting the bicycle to extreme loading impact and stress.

To meet the need for using bicycles in this combination of high stress use and challenging terrain, practitioners in the art have endeavored to provide bicycles which are extremely strong and durable while remaining substantially lightweight to reduce the energy required to pedal such bicycles across the often hilly and challenging terrain. Thus, a typical off-road bicycle utilizes a lightweight frame having many parts fabricated from aluminum and magnesium alloys. To provide the impact or shock absorption characteristic required to assure the durability and strength of the bicycle, the typical off-road bike utilizes a frame fabricated of a plurality of frame portions coupled together to form spring controlled shock absorbing suspension components. The intent is that the multiply articulated shock absorbing frame be capable of sustaining substantial impact while relying upon the suspension system to absorb much of the energy and thereby avoid frame damage.

The drive system most typically used in such off-road bicycles generally comprises a plurality of sprockets grouped at the pedal crank and rear wheel and having a flexible chain coupled therebetween. A variety of gear ratios or drive ratios are provided through the use of a chain derailleur mechanism which operates to switch the coupling chain between various combinations of front and rear sprockets.

While the multiple sprocket chain drive systems in use are extremely effective and provide a wide range of drive ratios to aid the cyclist in traversing challenging hills and trails, a problem often arises due to the combined effect of the flexing shock absorbing frame and the chain drive system. This problem is known generally as "chain whipping" and arises as the articulated frame portions flex to absorb impact and as the loading upon the drive chain is varied in different circumstances to create undesired slack within the drive chain causing the drive chain to flip from or disengage the front sprocket. This problem can be extremely annoying to cyclists in that it requires stopping and resetting the chain upon the sprockets before continuing to ride. In addition, the sudden release of resisting load caused by the chain skipping from the drive sprocket also raises the possibility of injury to the rider.

Thus, there remains a continuing need in the art for evermore improved chain drive systems for bicycles. In particular, there remains a continuing need in the art for systems and apparatus which will minimize or prevent the occurrence of chain whipping in such bicycles.

SUMMARY OF THE INVENTION

Accordingly, it is a general object of the present invention to provide an improved chain drive system for bicycles. It is a more particular object of the present invention to provide an improved chain drive system for bicycles in which the problems of chain whipping are substantially reduced or eliminated.

In accordance with the present invention, there is provided for use in a bicycle having a plurality of drive sprockets engaging a drive chain and having means for transferring the drive chain between drive sprockets, a chain guide comprises: a guide member defining a plurality of staggered step portions; support means for supporting the guide member proximate the drive sprockets of a bicycle in a first position which each of the step portions overlies one of the drive sprockets in a first position and in a second position in which the step portions are displaced from the drive sprockets; and spring means urging the guide member toward the first position.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

FIG. 3 sets forth a partially sectioned front view of the present invention chain guide during the sprocket switching operation of the chain drive system;

FIG. 4 sets forth a partially sectioned front view of an alternate embodiment of the present invention chain guide;

FIG. 5 sets forth a partially sectioned front view of a further alternate embodiment of the present invention chain guide;

FIG. 6 sets forth a partially sectioned view of a still further alternate embodiment of the present invention chain guide;

FIG. 10 sets forth a still further alternate embodiment of the present invention bicycle chain guide;

FIG. 11 sets forth a still further alternate embodiment of the present invention bicycle chain guide;

FIG. 12 sets forth a section view of the embodiment of FIG. 11 taken along section lines 12–12 therein;

FIG. 13 sets forth a still further alternate embodiment of the present invention bicycle chain guide; and FIG. 14 sets forth the guide support of the embodiment of FIG. 13,

DESCRIPTION OF THE PREFERRED EMBODIMENTS

Figure 1:
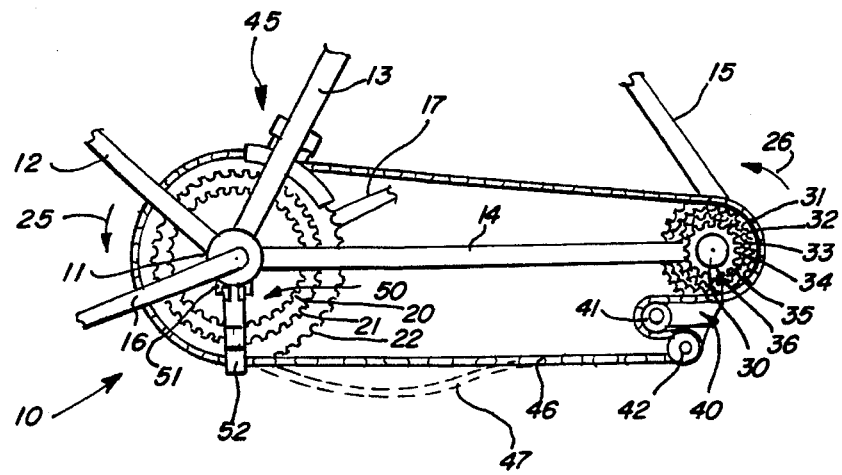
FIG. 1 sets forth a side elevation view of a typical bicycle chain drive system utilizing the present invention chain guide.

FIG. 1 sets forth a left side view of the lower drive portion of a conventional bicycle generally referenced by numeral 10. Bicycle 10 includes a frame having a front hub 11 and a rear hub 30 coupled by a chain stay 14. A rear support 15 extends upwardly from rear hub 30 while a seat post 13 extends upwardly from front hub 11. While not seen in FIG. 1, rear support 15 and seat post 13 converge to provide a seating support for the rider of bicycle 10. Front down tube 12 extends upwardly from hub 11 and is coupled to the remainder of the frame for bicycle 10. It will be understood by those skilled in the art that bicycle 10 includes a conventional construction not shown in FIG. 1 which includes a front wheel support, a handlebar assembly, and a seat support together with a seat all of which are not shown in FIG. 1 but which should be understood to be constructed in accordance with conventional fabrication techniques. Bicycle 10 further includes a plurality of front sprockets 20, 21 and 22 of progressively greater diameter rotatably supported upon hub 11 in accordance with conventional fabrication techniques. A pair of pedal cranks 16 and 17 are rotatably supported by front hub 11 in accordance with conventional fabrication techniques and operatively coupled to front sprockets 20 through 22. In further accordance with conventional fabrication techniques, a front derailleur 45 is supported upon seat post 13.

Rear hub 30 supports a plurality of rear sprockets 31 through 36 each progressively smaller in diameter and each rotatably supported by hub 30 in accordance with conventional fabrication techniques. While not seen in FIG. 1, it will be understood by those skilled in the art that rear sprockets 31 through 36 are operatively coupled to a rear wheel which supports the rear portion of bicycle 10. In further accordance with conventional fabrication techniques, a rear derailleur 40 is supported upon chain stay 14 and includes a pair of spring supported sprockets 41 and 42. A bicycle chain 46 is coupled between a selected one of front sprockets 20 through 22 and a selected one of rear sprockets 31 through 36. In the configuration shown in FIG. 1, chain 46 is received upon front sprocket 22 and rear sprocket 31. In addition, chain 46 is wound about sprockets 41 and 42 of rear derailleur 40.

In accordance with the present invention, a chain guide assembly generally referenced by numeral 50 includes a bracket 51 secured to the underside of front hub 11 and a movable guide 52. As is set forth below in greater detail, guide 52 is pivotally secured to bracket 51. In further accordance with the present invention and as is better seen in FIG. 2, guide 52 defines a plurality of steps 70, 71 and 72 separated by a corresponding plurality of wall portions 90, 91 and 92. As is also set forth below in greater detail, guide 52 is positioned proximate front sprockets 20 through 22 such that chain 46 is captivated between guide 52 and the corresponding sprocket upon which chain 46 is engaged. In the example of FIG. 1, chain 46 engages front sprocket 22 and thus as is better seen in FIG. 2, passes between end step 72 of guide 52 and the outer teeth of front sprocket 22.

In operation, the user propels bicycle 10 by imparting rotational motion to pedal cranks 16 and 17 through the generally accepted pedaling motion. The rotational motion of pedal cranks 16 and 17 is coupled to front sprockets 20 through 22 causing a corresponding rotation thereof in the direction indicated by arrow 25. In further accordance with conventional techniques, the rotational motion of front sprockets 20 through 22 produces a corresponding motion of chain 46 which in turn rotates rear sprocket 31 together with sprockets 32 through 36 in the direction indicated by arrow 26 to propel bicycle 10.

In order to accommodate the change of drive ratios for bicycle 10, the user actuates front derailleur 45 or rear derailleur 40 to change the sprocket 10 which chain 46 is engaged using the well known derailleur action. To accommodate the changes of sprocket engagement, the operation of rear derailleur 40 must accommodate the changes in diameter of the various sprockets by taking up chain slack in chain 46 or permitting chain 46 to engage a larger diameter sprocket. This action is well known in the art and, under normal circumstances, performs quite well. However, it is a natural consequence of the operation of pedal cranks 16 and 17 in propelling bicycle 10 that a certain degree of chain slack such as that shown in dashed-line representation 47 tends to exist in the lower portion of chain 46. Once again under normal circumstances, the action of rear derailleur 40 is able to control such chain slack and avoid any undue problems. However, under the difficult and challenging riding conditions encountered by off-road cyclists, the variation of pedal crank energy applied by the user as well as the frequent high energy impacts imparted to bicycle 10 due to the rough terrain being traversed may produce chain slack which exceeds the capability of rear derailleur 40 to compensate.

In accordance with an important aspect of the present invention, chain guide assembly 50 operates to maintain the engagement of chain 46 with the selected one of front sprockets 20 through 22 despite the existence of substantial or even excessive chain slack 47 during the time required for rear derailleur 40 to respond and absorb the excess chain slack. The operation of chain guide assembly 50 is set forth below in greater detail. However, suffice it to note here that chain guide assembly 50 operates by maintaining guide 52 in close proximity to chain 46 and front sprockets 20 through 22. In essence, guide 52 captivates chain 46 against the engaged one of sprockets 20 through 22 to preclude excessive separation between chain 46 and the engaged front sprocket despite the existence of chain slack which would otherwise cause this separation.

It has often been found that the slack within chain 46 develops a characteristic much like a travelling wave in response to bumps or impact in the lower portion of chain 46. These waves are generally referred to as chain whipping and tend to travel forwardly from sprocket 42 toward front sprockets 20 through 22. Once again, the presence of guide 52 of chain guide assembly 50 operates in accordance with the present invention to prevent this forwardly moving wave or chain whip from separating chain 46 from the engaged front sprocket.

In further accordance with the present invention and as is described below in greater detail, guide 52 is pivotally secured to bracket 51 of chain guide assembly 50 to facilitate the movement of chain 46 between front sprockets 20 through 22. Suffice it to note here, however, that guide 52 pivots outwardly away from chain 46 as chain 46 is moved between front sprockets in the manner described below in FIG. 3 in greater detail. Once the chain transfer between sprockets is complete, a biasing spring returns guide 52 to the normal operative position shown in FIG. 2. Thus, chain guide assembly 50 is able to maintain the control of chain whipping problems regardless of which of the several front sprockets are engaged with chain 46 and despite repeated changes of chain 46 between sprockets.

Figure 2:
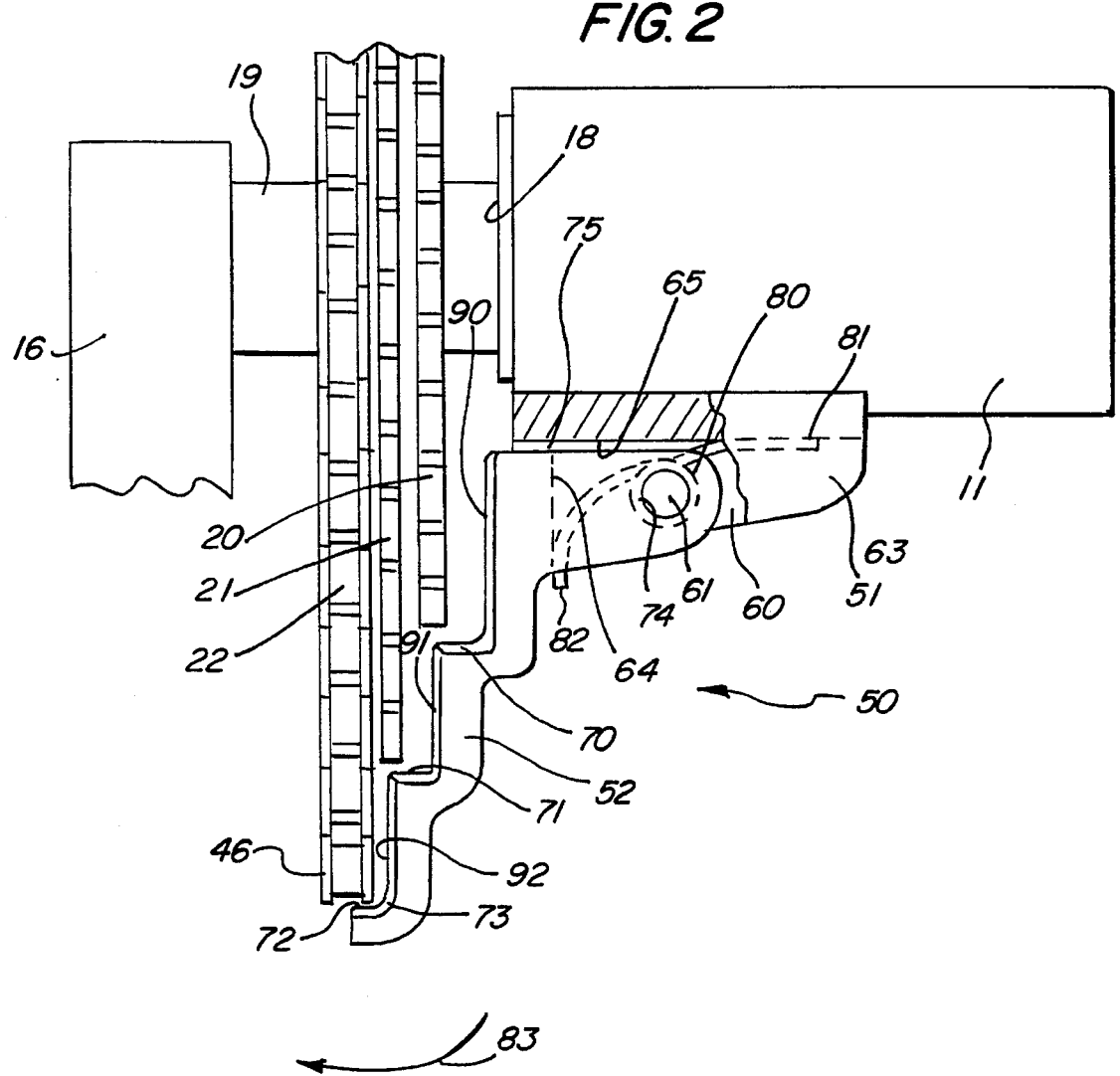
FIG. 2 sets forth a partially sectioned front view of the present invention chain guide during normal operation.

FIG. 2 sets forth a partial section view of chain guide assembly 50 together with front sprockets 20 through 22 and chain 46 in the normal operating configuration. As described above, bicycle 10 includes a front hub 11 supporting a pedal crank 16 and chain guide assembly 50. Pedal crank 16 further includes a shaft 19 extending through sprockets 20 through 22 and engaged therewith. Shaft 19 further extends through front hub 11 in accordance with conventional fabrication techniques and is rotatably supported therein. A bearing cup 18 is threadably received within front hub 11 in the manner shown in FIG. 8. Chain guide assembly 50 includes a bracket 51 secured to the underside of front hub 11 using conventional fastening techniques such as threaded fasteners (not shown). Bracket 51 defines a pair of flanges 62 and 63 forming a channel 60 therebetween. Bracket 51 further includes a front wall 64 terminating the interior end of channel 60. A cylindrical pin 61 is received within a pair of apertures in flanges 62 and 63 (not shown) to provide a pivotal support for a guide 52. Bracket 51 further defines a bottom surface 65 extending generally parallel to the underside of front hub 11.

Guide 52 defines an elongated member having an aperture 74 receiving pin 61 to provide a pivotal attachment between guide 52 and bracket 51. Guide 52 further defines a surface 75 generally parallel to bottom surface 65. A coil spring 80 is wound about pin 61 and includes an end 81 received against bottom surface 65 of bracket 51 and an end 82 received against wall portion 64 of guide 52. Guide 52 further includes a plurality of staggered wall surfaces 90, 91 and 92 and a corresponding plurality of staggered step portions 70, 71 and 72. Step portions 70, 71 and 72 are positioned to extend approximately to the midpoints of sprockets 20 through 22 respectively. As can be seen in FIG. 2 and in accordance with an important aspect of the present invention, step portions 70 through 72 are spaced from the outer periphery of sprockets 20 through 22 by a sufficient distance to facilitate the engagement of chain 46 with a selected one of sprockets 20 through 22 without causing contact or rubbing between chain 46 and guide 52.

In the normal or operative configuration shown in FIG. 2, spring 80 provides a spring force urging guide 52 to pivot about pin 61 in the direction indicated by arrow 83. The extent of pivotal motion of guide 52 resulting from the force of coil spring 80 is limited by the contact of surface 75 of guide 52 and bottom surface 65 of bracket 51. In the position shown in FIG. 2, this contact between surfaces 65 and 75 positions guide 52 in its normal operative condition.

It should be noted that FIG. 2 depicts a partially sectioned view of chain guide assembly 50 looking rearwardly from the front portion of bicycle 10.

Thus, in the position shown in FIG. 2, chain 46 engages sprocket 22 in the manner shown in FIG. 1 while guide 52 is positioned as shown. Accordingly, end step 72 of guide 52 overlies and extends beyond chain 46. While a slight clearance exists between end step 72 of guide 52 and chain 46 to avoid contact therebetween under normal operating conditions, the presence of end step 72 in the position shown precludes outward motion of chain 46 away from sprocket 22 to a distance sufficient to disengage chain 46 from sprocket 22 during the occurrence of the above-described chain whipping action. Thus, it should be understood that coil spring 80 is selected to provide sufficient spring force against guide 52 to resist any outward force of chain 46 against end step 72 and thereby assure the control of the above-described chain whipping.

It will be apparent to those skilled in the art that chain 46 may similarly be received upon the additional front sprockets 20 and 21 in a manner similar to that shown. In such case, step 70 and 71 operate in a similar manner to that shown for step 72 to maintain the engagement of chain 46 with sprockets 20 or 21 respectively.

Thus, under normal pedaling configuration and in the absence of a transfer or chain 46 between sprockets 20 through 22, chain guide assembly 50 maintains the configuration and position shown in FIG. 2. To facilitate the understanding of the response to chain guide assembly 50 to the transfer of chain 46 between sprockets 20 through 22, it is important to note that guide 52 defines chamfered surfaces 73 extending along the frontal edges of walls 90, 91 and 92 and angled surfaces 76 at steps 70 and 71. The importance of these chamfered surfaces and angled surfaces is set forth below in greater detail in FIG. 3. However, suffice it to note here that they facilitate the pivotal motion of guide 52 outwardly away from sprockets 20 through 22 as chain 46 is moved between sprockets. It will be apparent to those skilled in the art that while chamfered surfaces 73 and angled surfaces 76 are shown as a generally planar facet, other angled or curved surfaces may be utilized to configure the leading edge of steps 70 through 72 and wall portions 90 through 92 to provide the appropriate pivotal motion of guide 52.

FIG. 3 sets forth the operation of the present invention chain guide assembly in response to a typical transfer of chain 46 between sprockets. In the position shown in FIG. 3, derailleur 45 (seen in FIG. 1) has been operated by the user in accordance with conventional fabrication techniques to begin shifting chain 46 from sprocket 22 to sprocket 21 or, alternatively, to sprocket 20. For purposes of illustration, it will be assumed that chain 46 is being transferred from sprocket 22 to sprocket 21. In accordance with conventional derailleur operation, chain 46 is urged or angled by derailleur 45 in the direction indicated by arrow 27 causing chain 46 to be separated from sprocket 22 and forced in the direction of arrow 27 as the user continues to pedal and sprockets 20 through 22 continue to rotate. In accordance with an important aspect of the present invention, the lateral force of chain 46 in the direction of arrow 27 forces chain 46 against ball portion 92 of guide 52 overcoming the force of coil spring 80 and pivoting guide 52 outwardly in the direction indicated by arrow 84. It is this pivotal motion of guide 52 which permits the present invention chain guide assembly to accommodate the transfer of chain 46 between sprockets 20 through 22. In the position shown in FIG. 3, chain 46 has forced guide 52 in the direction of arrow 84 a sufficient distance to permit chain 46 to be drawn toward sprocket 21 in the direction indicated by arrow 28 as the user continues to pedal and rotate sprockets 20 through 22. The pedaling force draws spring 46 in the direction of arrow 28 and causes chain 46 to engage sprocket 21. It will be appreciated by those skilled in the art that once chain 46 is moved toward sprocket 21 and engages sprocket 21, the lateral force imparted to guide 52 by chain 46 is released as chain 46 passes beyond step 71 of guide 52. Once chain 46 passes beyond step 71, guide 52 again pivots under the urging of spring 80 in the direction indicated by arrow 85 allowing guide 52 to return to the normal operating position shown in FIG. 2. During this pivotal motion of guide 52, chamfered surfaces 73 and angled surfaces 76 facilitate the pivotal motion and avoids undue force upon guide 52 as chain 46 moves past guide 52.

While the operation depicted in FIGS. 2 and 3 sets forth the transfer of chain 46 between sprockets 22 and 21, it will be apparent to those skilled in the art that a similar action results during transfer of chain 46 between any of the front sprockets with the important characteristic being the pivotal motion imparted to guide 52 to provide sufficient clearance between chain 46 and guide 52. In addition, each time a transfer of chain 46 is completed, the force of coil spring 80 again returns guide 52 to the operating position shown in FIG. 2.

FIG. 4 sets forth an alternate embodiment of the present invention bicycle chain guide generally referenced by numeral 100. Chain guide assembly 100 is substantially identical to chain guide assembly 10 set forth above with the difference being the attachment of bracket 101 to hub 11 using a weld junction 108. Thus, bracket 101 is secured to the underside of hub 11 by welds 108 and supports a cylindrical pin 102. A guide 103 substantially identical to guide 52 set forth above is pivotally secured to bracket 101 by pin 102 and defines staggered step portions 103, 104 and 105. While not seen in FIG. 4, it will be appreciated that guide 103 includes a coil spring identical to spring 80 set forth above which urges guide 103 in the direction indicated by arrow 107 while facilitating the pivotal motion of guide 103 in the direction indicated by arrow 106 during the chain transfer process described above. In all other respects but for the attachment of bracket 101 using weld junction 108, chain guide assembly 100 functions in the identical manner to chain guide 10 set forth above.

FIG. 5 sets forth a still further alternate embodiment of the present invention bicycle chain guide generally referenced by numeral 110. Chain guide assembly 110 includes a generally cylindrical clamp 111 having a fastener 112 secured thereto. Clamp 111 has preferably formed in a generally cylindrical shape resembling a C-shaped cross-section permitting fastener 12 to extend between the open portions thereof and thereby secure clamp 111 to hub 11. Clamp 111 further includes a flange 113 extending downwardly therefrom defining a plurality of apertures 114, 115 and 116. Apertures 114, 115 and 116 facilitate the attachment of guide 120 at different distances from the center line of hub 11 and thereby permit chain guide assembly 110 to accommodate different sprocket diameters. Guide 120 is pivotally secured to flange 113 by a generally cylindrical pin 117. Guide 120 defines a plurality of staggered steps 122, 123 and 124 and a limit tab 121. A coil spring 125 encircles pin 117 and includes an end 126 extending along the underside of clamp 111 and an end 127 extending along the lower edge of guide 120. Spring 125 provides a spring force upon guide 120 urging guide 120 toward pivotal motion about pin 117 in the direction indicated by arrow 129. Limit tab 121 precludes further motion of guide 120 in the direction of arrow 129 beyond the generally vertical position shown in FIG. 5.

The operation of chain guide assembly 110 is substantially identical to that described above for chain guide assembly 10 in that steps 122, 123 and 124 provide captivation of spring 46 (seen in FIG. 1) during normal pedaling operation while the pivotal motion of guide 120 in the direction indicated by arrow 128 facilitates the transfer of chain 46 between sprockets in the manner also described above.

FIG. 6 sets forth a partially sectioned view of a still further alternate embodiment of the present invention bicycle chain guide having a chain guide assembly generally referenced by numeral 130. Chain guide assembly 130 includes a generally circular bracket 131 having a center aperture (not shown) which receives bearing cup 18 and is secured to one end of hub 11 by the threaded engagement of bearing cup 18 within hub 11. Bracket 131 extends downwardly from hub 11 and defines a flange 132. Flange 132 defines a plurality of apertures such as aperture 133. Guide 135 is fabricated in a similar manner to guide 120 set forth in FIG. 5 and defines a plurality of step portions 141, 142 and 143. Guide 135 further defines an aperture 137 which receives a generally cylindrical pin 134 passing through an underlying aperture in flange 132 (not shown) to provide pivotal attachment of guide 135 to flange 132. A coil spring 138 is wound about pin 134 and defines an end 140 extending across the interior surface of bracket 131 and an end 139 extending across the outer surface of guide 135. Coil spring 138 produces a spring force urging guide 135 toward pivotal motion in the direction indicated by arrow 145. The pivotal motion of guide 135 in the direction of arrow 145 is limited by the contact of guide 135 with the underlying surface of bracket 131.

The operation of the embodiment of FIG. 6 is substantially the same as that set forth in the previous embodiments in that spring 138 maintains guide 135 and the position shown in the absence of an intervening force provided as chain 46 (seen in FIG. 1) is transferred between sprockets in the manner described above in FIGS. 2 and 3. In accordance with the above-described embodiments, chain guide assembly 130 operates in a similar fashion as guide 135 is displaced or pivoted in the direction indicated by arrow 144 as the spring transfer produces a lateral force against guide 135 overcoming the force of spring 138 temporarily until the chain has been transferred and engages the next sprocket. Thus, it will be apparent that the primary difference of the embodiment of FIG. 6 is the attachment of bracket 131 to hub 11 using the threaded attachment of bearing cup 18. In all other respects, the operation of chain guide assembly 130 is substantially the same as that described above in previous embodiments.

Figure 7:
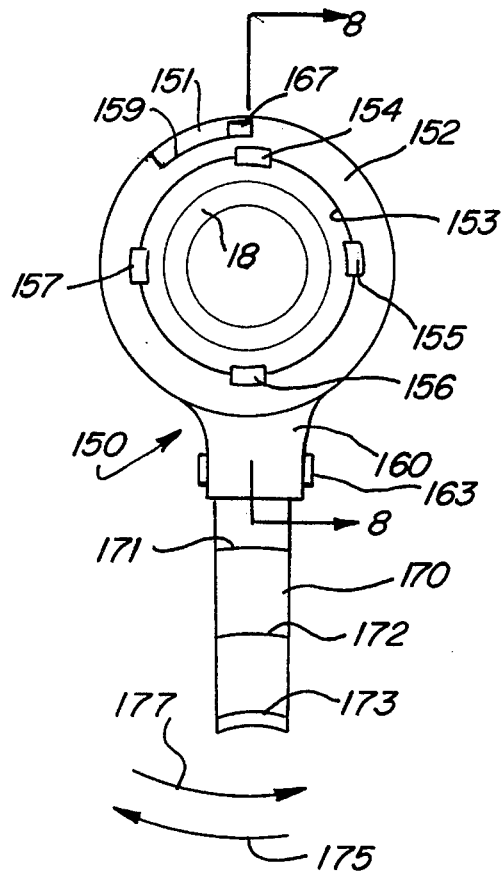
FIG. 7 sets forth a partially sectioned right side view of a still further alternate embodiment of the present invention.
Figure 8:
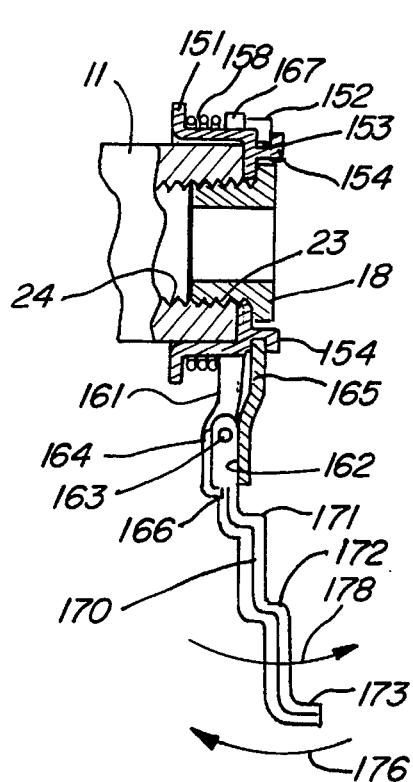
FIG. 8 sets forth a partially sectioned front view of the embodiment of the present invention chain guide shown in FIG. 7.
Figure 9:
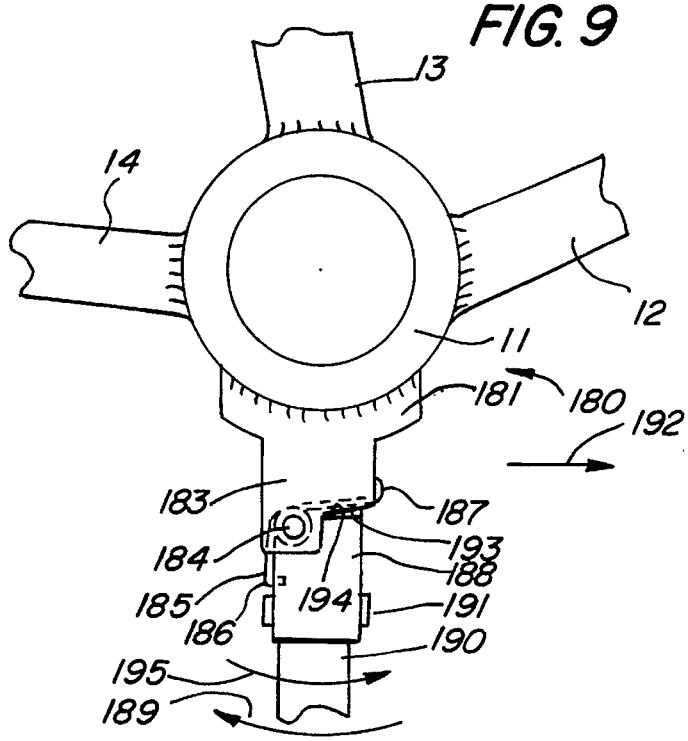
FIG. 9 sets forth a partially sectioned right hand view of a still further alternate embodiment of the present invention chain guide.

The further alternate embodiments set forth in FIGS. 7 and 8 and the still further alternate embodiments set forth in FIG. 9 differ from the previously illustrated embodiments of the present invention in that they utilize a second pivotal attachment for the chain guide assembly to facilitate pivotal motion or "breakaway" action in the event the chain guide encounters an obstacle and receives a front to back impact. This additional pivotal capability avoids damage to the chain guide assembly and is particularly suited to use in extremely rough terrain.

More specifically, FIG. 7 sets forth a still further alternate embodiment of the present invention generally referenced by numeral 150. FIG. 7 shows a right side view of chain guide assembly 150. For purposes of orientation, arrow 174 indicates the forward travel direction of the bicycle upon which chain assembly 150 is operating. For purposes of illustration, the remaining components of bicycle 10 have been omitted from FIG. 7 including the omission of front sprockets 20, 21 and 22 which should be understood to be generally concentric with bearing cup 18. Thus, chain guide assembly 150 is secured to hub 11 in the manner shown in FIG. 8. Chain guide assembly 150 includes a fixed bracket 151 having a generally circular shape secured to hub 11 by the threaded attachment of bearing cup 18. As is better seen in FIG. 8, the threaded attachment of bearing cup 18 captivates fixed bracket 151 securely against the right hand surface of hub 11. Returning to FIG. 7, chain guide assembly 150 further includes a generally circular movable bracket 152 defining a center aperture 153 and a downwardly extending extension 160. Movable bracket 152 further defines an arcuate slot 159. Correspondingly, fixed bracket 151 defines an upwardly extending tab 167 received within slot 159. Fixed bracket 151 further defines a plurality of outwardly extending tabs 154, 155, 156 and 157 equally spaced about aperture 153 of movable bracket 152. Tabs 154 are generally L-shaped and thus extend beyond aperture 153 a sufficient distance to captivate movable bracket 152 and secure it to fixed bracket 151 in an attachment which permits the rotational motion of bracket 152. Tab 167 extending into slot 59 provides an angular limitation of the rotation of bracket 152 with respect to fixed bracket 151. In the position shown in FIG. 7, tab 167 abuts the clockwise end of slot 159 and thus movable bracket 152 is shown positioned in the maximum counterclockwise rotational position permitted by tab 167.

As is better seen with temporary reference to FIG. 8, a torsion spring 158 is wound about fixed bracket 151 and is, by conventional attachment means, secured to fixed bracket 151 and movable bracket 152 such that movable bracket 152 is urged by the torsional force of spring 158 toward rotation with respect to fixed bracket 151 in the counterclockwise direction indicated by arrow 177 in FIG. 7.

Returning to FIG. 7, extension 160 of movable bracket 152 receives an elongated cylindrical pin 163. A guide 170 is pivotally secured to extension 160 by pin 163. Guide 170 is preferably formed of a stamped metal material and defines a generally arcuate or curved cross-section together with a plurality of step portions 171, 172 and 173. The fabrication of guide 170 of a stamped metal material permits guide 170 to be fabricated in a lower cost production method in which the arcuate or curved cross-section of guide 170 removes the need for providing a chamfered surface on guide 170 such as chamfered 73 in FIG. 2. As is set forth below in conjunction with FIG. 8, guide 170 is pivotally secured and spring biased to the downwardly extending position shown and functions in accordance with the above-described operation to pivot away from sprockets 20 through 22 (seen in FIG. 1) during the chain transfer operation. In further accordance with the above-described operation of the present invention chain guide, guide 170 utilizes steps 171, 172 and 173 to captivate and retain the chain against the engaged sprocket and prevent separation of the chain and sprocket during the chain whipping action also described above.

In accordance with a further advantage of the embodiment shown in FIGS. 7 and 8, the rotatable support of bracket 152 with respect to bracket 151 and the spring bias of torsion spring 158 permits bracket 152 and guide 170 to pivot in the direction indicated by arrow 175 in the event guide 170 is struck by an object or contacts a portion of the underlying terrain as the host bicycle moves forwardly in the direction indicated by arrow 174. The occurrence of an impact against guide 170 overcomes the force of torsion spring 158 and permits guide 170 to pivot in the direction of arrow 175. Once the impacting object is removed, the force of torsion spring 158 pivots guide 170 and bracket 152 in the direction indicated by arrow 177 until tab 167 again contacts the clockwise end of slot 159 thereby restoring chain guide assembly 150 to the configuration shown in FIG. 7.

FIG. 8 sets forth a section view of chain guide assembly 150 taken along section lines 8—8 in FIG. 7. As described above, chain guide assembly 150 includes a fixed bracket 151 secured to hub 11 by the threaded attachment of bearing cup 18. Accordingly, bearing cup 18 defines a plurality of threads 23 which are received upon and engage internal threads 24 of hub 11. Chain guide assembly 150 further includes a movable bracket 152 defining an aperture 153 and a downward extension 160. Movable bracket 152 is received upon the frontal portion of fixed bracket 151 and is pivotally secured thereto by a plurality of tabs 154 through 157 extending through aperture 153 and outwardly to captivate bracket 152. Thus, movable bracket 152 is pivotable with respect to fixed bracket 151 in the above-described pivotal motion which is limited by the interaction of tab 167 of fixed bracket 151 and slot 159 formed in movable bracket 152. Extension 160 defines a support rib 161 and an interior surface 162. A pin 163 extends through apertures formed in extension 160 (not shown) to pivotally secure guide 170 in the manner shown. As described above, guide 170 is preferably formed of a stamped metal material having a curved or arcuate cross-section and defining a plurality of step portions 171, 172 and 173. A spring 164 is received upon pin 163 and defines an end portion 165 extending to surface 162 of extension 160 and an end portion 166 extending across the rearward surface of guide 170. Thus, spring 164 provides a spring force urging guide 170 toward pivotal motion in the direction indicated by arrow 178. The contact of the frontal portion of guide 170 with surface 162 of extension 160 limits the pivotal movement of guide 170 in the direction of arrow 178.

Under normal operating conditions, guide 170 is maintained in the position shown in FIG. 8 and accordingly, step portions 171, 172 and 173 provide the above-described captivation of the bicycle chain against an engaging sprocket to prevent separation thereof due to chain whipping. In the event, however, the chain of the host bicycle is transferred between sprockets in the manner shown in FIG. 2 and 3, the lateral force imparted to guide 170 overcomes the force of spring 164 and pivots guide 170 in the direction indicated by arrow 176. This pivotal motion of guide 170 facilitates the transfer of the chain between sprockets. Once the chain transfer is complete, the force of spring 164 restores guide 170 to the position shown in FIG. 8.

Thus, the embodiment shown in FIGS. 7 and 8 facilitates the prevention of chains and sprocket separation due to chain whipping while further providing an impact absorbing pivotal motion for the chain guide assembly which allows chain guide assembly 150 to pivot upon front to back impact to avoid damage to chain guide assembly as the host bicycle traverses rough terrain or encounters impacting objects.

FIG. 9 sets forth a right side view of a still further alternate embodiment of the present invention providing an impact absorbing action and generally referenced by numeral 180. Chain guide assembly 180 includes a bracket 181 secured to the underside of hub 11 by a weld junction 182. Bracket 181 defines a downwardly extending extension 183 having a pin 184 secured thereto. A link 188 is pivotally secured to extension 183 by apertures formed therein (not shown) and the extension of pin 184 therethrough. Thus, link 188 is pivotally secured to extension 183 by pin 184. Extension 183 defines a surface 193 while link 188 defines a surface 194. A coil spring 185 is wound about pin 184 and defines an end 186 coupled to link 188 and an end 187 coupled to extension 183. Spring 185 provides a spring force against link 188 urging link 188 toward pivotal motion in the direction indicated by arrow 195. The contact of surfaces 193 and 194 limits the pivotal motion of link 188 to the configuration shown in FIG. 9.

Chain guide assembly 180 further includes a downwardly extending guide 190 fabricated substantially in accordance with guide 170 shown in FIG. 7. Guide 190 is pivotally coupled to link 188 by an elongated cylindrical pin 191. While not seen in FIG. 9, chain guide assembly 180 further includes a spring coupled between link 188 and guide 190 in the manner in which spring 164 is coupled between extension 160 and guide 170 in the embodiment shown in FIGS. 7 and 8. Thus, guide 190 operates in the manner described above for guide 170 in the embodiment of FIG. 8.

In addition, the pivotal attachment of link 188 to extension 183 permits guide 190 and link 188 to pivot in the direction indicated by arrow 189 in the event an impact is received against guide 190. This impact overcomes the force of spring 185 permitting guide 190 and link 188 to pivot in the direction of arrow 189 as the host bicycle travels in the forward direction indicated by arrow 192. Once the impact object is no longer present, the force of spring 185 pivots guide 190 and link 188 in the direction of arrow 195 restoring guide 190 and link 188 to the normal operating position shown in FIG. 9.

FIG. 10 sets forth a still further alternate embodiment of the present invention chain guide generally referenced by numeral 200. Chain guide 200 is preferably fabricated of a resilient spring steel material or suitable resilient plastic material and defines a flange 205 secured to hub 11 by a pair of fasteners 206 and 207. A guide portion 201 extends downwardly from flange 205 and defines step portions 202, 203 and 204. Chain guide 200 provides a simplified embodiment of the present invention in which the flexibility of guide portion 201 is utilized in place of the pivotal coupling and spring attachments used in the embodiments set forth in FIGS. 1 through 9. Thus, during chain transfer between sprockets, the lateral force imparted to guide portion 201 by the displaced drive chain of the host bicycle causes guide portion 201 to flex due to its resilient property and thereby facilitates the chain transfer. Once the chain has been transferred between sprockets, the resilience of guide member 201 restores it to the position shown in FIG. 10.

FIG. 11 sets forth a still further alternate embodiment of the present invention secured to hub 11 using a bearing cup 17. A bracket 211 defines a circular aperture receiving bearing cup 18 through the cooperation of which bracket 211 is firmly secured to hub 11. Bracket 211 further includes a square-shaped extension 212 extending downwardly from hub 11 and defining a socket 213. Socket 213 defines a square cross-section as is better seen in FIG. 12 and receives a resilient sleeve 215. A guide 214 having a generally square cross-section is formed in the manner described above to define a plurality of steps 216, 217 and 218 which function in the manner described above to provide a chain guide. Guide 214 further defines a square-shaped end 220 (better seen in FIG. 12) which is received within resilient sleeve 215 and captivated within socket 213. The resilience of sleeve 215 permits guide 214 to move within socket 213 and thereby accommodate the changing of sprockets by chain 46 in the above-described manner. Essentially, as chain 46 is moved against guide 214 during the chain transfer process, guide 214 flexes outwardly due to the resilience of sleeve 215.

FIG. 12 sets forth a section view of chain guide assembly 210 taken along section lines 12—12 in FIG. 11. As can be seen, bracket 211 defines a generally planar member having a square-shaped extension 212 which defines a square cross-section socket 213. A square end 220 of guide 214 is received within socket 213 and surrounded by a resilient sleeve 215.

FIGS. 13 and 14 set forth a still further alternate embodiment of the present invention chain guide assembly generally referenced by numeral 230. Chain guide assembly 230 includes a bracket 230 (better seen in FIG. 14) which defines an aperture 231 receiving bearing cup 18 to secure bracket 230 against hub 11. As is also better seen in FIG. 14, bracket 230 defines a downwardly extending flange 240 having a plurality of apertures 232 through 235 defined therein.

Returning to FIG. 13 with bracket 230 secured to hub 11 using bearing cup 18, a chain guide 241 formed of a resilient spring wire defines a plurality of steps 242, 243 and 244 together with an end loop 246. End loop 246 receives a fastener 247 which extends through a selected one of apertures 232 through 235 in a threaded attachment to secure guide 241 to bracket 230. Guide 241 in its preferred form further defines a plurality of spring coil loops 245 which increase the flexibility of guide 241.

In operation, guide 241 performs the above-described chain guide function using steps 242 through 244. The chain transfer process is accommodated by guide 241 as the flexible loops within loops 245 flex under the force of the transferring chain during the above-described chain transferring process. Thus, as the chain exerts a lateral force against guide 241 during the chain transfer process, guide 241 flexes at loops 245 to accommodate this transfer afterwhich the resilience of loops 245 returns guide 241 to the position shown in FIG. 13.

What has been shown is a novel chain guide for a bicycle or the like in which a pivotally secured guide member is maintained in proximity to the front sprockets of the bicycle drive system to prevent the chain from separating from the engaged sprocket during chain whipping action as the host bicycle traverses rough terrain or the like. The chain guide set forth above may readily be secured to a host bicycle using a variety of securing methods and mounting apparatus without departing from the spirit and scope of the present invention.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

That which is claimed is:

1. For use in a bicycle having a frame and a plurality of staggered drive sprockets for engaging a drive chain and having means for transferring the drive chain between drive sprockets, a chain guide comprising:

a guide member defining a plurality of staggered step portions;

support means coupled to said frame for movably supporting said guide member proximate the drive sprockets of a bicycle in a first position in which each of said step portions overlies one of the staggered drive sprockets and in a second position in which said step portions are displaced from the drive sprockets; and spring means coupled to said guide member for imparting a spring force to said guide urging said guide member toward said first position and yielding to forces imparted to said guide member while the drive chain is transferred between drive sprockets to allow said guide member to move toward said second position during such chain transfer.

2. A chain guide as set forth in claim 1 wherein said support means includes:

a bracket secured to the bicycle; and a pivotal coupling coupled to said bracket and said guide member.

3. A chain guide as set forth in claim 2 wherein said guide member defines a plurality of corner edges formed on said step portions.

4. A chain guide as set forth in claim 3 wherein said guide member defines a forward edge and wherein said forward edge defines an angled chamfer.

5. A chain guide as set forth in claim 3 wherein said guide member defines a forward edge and wherein said forward edge defines a curved surface.

6. A chain guide as set forth in claim 3 wherein said guide member defines an arcuate cross-section.

7. A chain guide as set forth in claim 1 wherein said support means includes:

a first bracket secured to the bicycle;

a second bracket;

a first pivotal coupling coupling said first and second brackets such that said second bracket is pivotable in the direction of bicycle travel; and a second pivotal coupling coupling said guide member to said second bracket.

8. A chain guide as set forth in claim 7 wherein said first and second brackets define generally concentric circular members.

9. A chain guide as set forth in claim 1 wherein said support means includes a bracket secured to said bicycle and wherein said spring means includes a resilient coupler attaching said guide member to said bracket.

10. A chain guide as set forth in claim 1 wherein said guide member is formed of spring wire and wherein said spring means include a plurality of spring loops formed in said wire.

11. For use in a bicycle having a plurality of drive sprockets for selectively engaging a drive chain and having means for transferring the drive chain between sprockets, a chain guide comprising:

a guide member defining a plurality of stairstep portions each forming a corner edge; and support means for resiliently supporting said guide member proximate said plurality of drive sprockets such that each of said corner edges at least partially overlies and is spaced from one of the bicycle drive sprockets.

12. For use in a bicycle pedal drive for moving a bicycle in a direction of travel having a front hub rotatably supporting a plurality of staggered diameter drive sprockets for selectively engaging a drive chain and having means for transferring the drive chain between sprockets, a chain guide comprising:

a bracket secured to the bicycle hub;

a guide member defining a plurality of stairstep portions each forming a corner edge arranged to conform generally to the drive sprockets; and support means coupled to said bracket and said guide member for resiliently supporting said guide member proximate said drive sprockets such that each of said corner edges at least partially overlies one of the drive sprockets.

13. A chain guide as set forth in claim 12 wherein said bracket is welded to the bicycle hub.

14. A chain guide as set forth in claim 12 wherein said bracket includes a clamp attachment member for grasping at least a portion of the bicycle hub.

15. A chain guide as set forth in claim 12 wherein the bicycle includes a bearing cup threadably secured to the hub and wherein said bracket defines an aperture for receiving the bearing cup and securing said bracket to the bicycle hub.

16. A chain guide as set forth in claim 12 wherein said support means includes a pivotal attachment coupling said bracket to the bicycle hub to permit said guide member to pivot in the direction of travel.

\* \* \* \* \*